United States Patent
Zhang et al.

(10) Patent No.: US 10,784,946 B2
(45) Date of Patent: Sep. 22, 2020

(54) COMMUNICATION DEVICE AND METHOD FOR SELECTING A BEAM DIRECTION

(71) Applicant: Intel IP Corporation, Santa Clara, CA (US)

(72) Inventors: Jinyu Zhang, Beijing (CN); Yuan Zhu, Beijing (CN); Huaning Niu, San Jose, CA (US); Honglei Miao, Munich (DE); Yang Tang, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/305,916

(22) PCT Filed: Jul. 1, 2016

(86) PCT No.: PCT/CN2016/088079
§ 371 (c)(1),
(2) Date: Nov. 30, 2018

(87) PCT Pub. No.: WO2018/000405
PCT Pub. Date: Jan. 4, 2018

(65) Prior Publication Data
US 2020/0091988 A1    Mar. 19, 2020

(51) Int. Cl.
*H04B 7/02* (2018.01)
*H04B 7/06* (2006.01)
*H04B 7/08* (2006.01)

(52) U.S. Cl.
CPC .......... *H04B 7/0695* (2013.01); *H04B 7/088* (2013.01)

(58) Field of Classification Search
CPC ............................. H04B 7/0695; H04B 7/088
USPC ......................................................... 375/267
See application file for complete search history.

(56) References Cited

U.S. PATENT DOCUMENTS

| | | | |
|---|---|---|---|
| 8,320,942 B2 * | 11/2012 | Sadri ..................... | H04W 76/19 455/466 |
| 9,831,932 B2 | 11/2017 | Kang et al. | |
| 2009/0238156 A1 * | 9/2009 | Yong .................... | H04B 7/0491 370/336 |

(Continued)

FOREIGN PATENT DOCUMENTS

CN        105359427 A        2/2016

OTHER PUBLICATIONS

International Search Report based on application No. PCT/CN2016/088079 dated Mar. 31, 2017 (3 pages) (Reference Purpose Only).

*Primary Examiner* — Don N Vo
(74) *Attorney, Agent, or Firm* — Kowert, Hood, Munyon, Rankin & Goetzel, P.C.

(57) ABSTRACT

A communication device including a first directional antenna and a second directional antenna which may each be set to any one of a plurality of main beam directions for radio communication, a transceiver configured to determine a reception quality for at least some of the plurality of main beam directions using the first directional antenna and for at least some of the plurality of main beam directions using the second directional antenna, select a main beam direction of the plurality of main beam directions based on the reception qualities determined by the first directional antenna and based on the reception qualities determined by the second directional antenna, and perform communication using the selected main beam direction.

20 Claims, 14 Drawing Sheets

(56) References Cited

U.S. PATENT DOCUMENTS

| | | | |
|---|---|---|---|
| 2010/0151865 A1* | 6/2010 | Camp, Jr. | H04W 72/046 |
| | | | 455/445 |
| 2011/0143807 A1 | 6/2011 | Aue et al. | |
| 2011/0243040 A1 | 10/2011 | Khan et al. | |
| 2014/0368384 A1* | 12/2014 | Leiba | H01Q 19/062 |
| | | | 342/374 |
| 2016/0080058 A1 | 3/2016 | Kang et al. | |

* cited by examiner

FIG 7
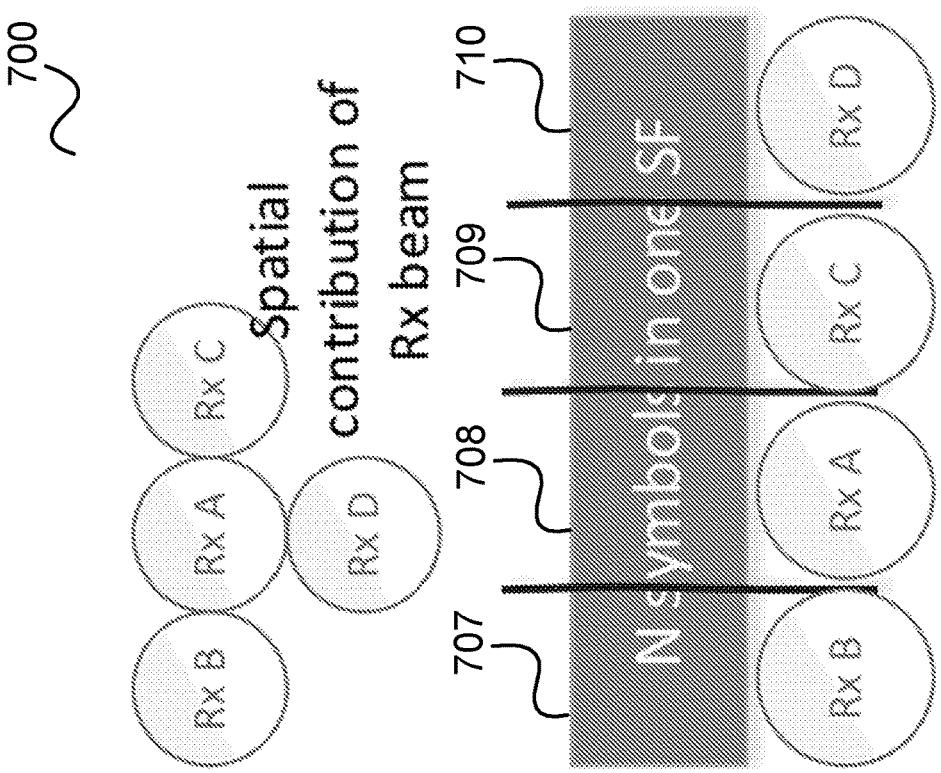
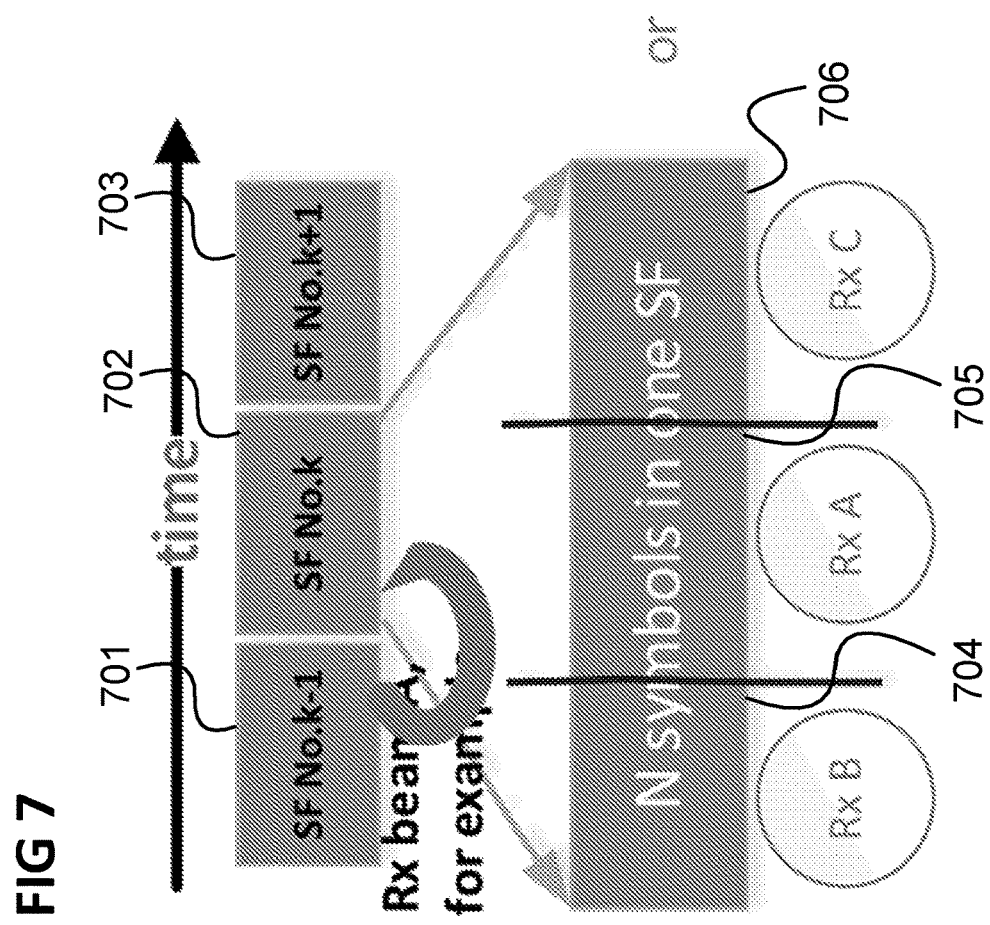

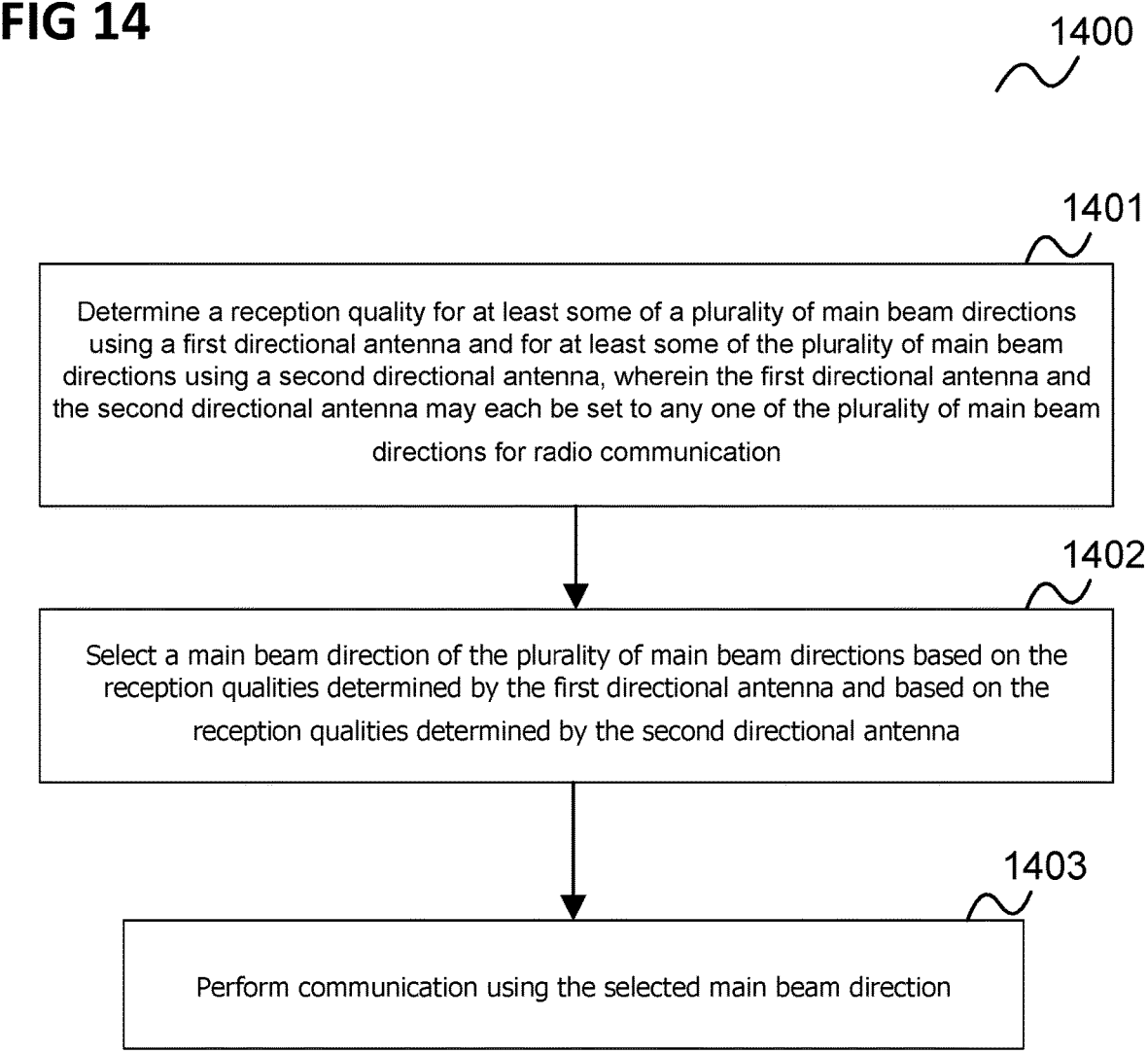

_US 10,784,946 B2_

COMMUNICATION DEVICE AND METHOD FOR SELECTING A BEAM DIRECTION

CROSS-REFERENCE TO RELATED APPLICATIONS

This application is a national stage entry under 35 U.S.C. § 371 of PCT Application No. PCT/CN2016/088079 filed Jul. 1, 2016, which is entirely incorporated herein by reference.

TECHNICAL FIELD

The present disclosure generally relates to communication devices and methods for selecting a beam direction.

BACKGROUND

To increase the throughput in cellular communication systems, the usage of millimeter (mm) wave signals for radio transmission is considered. Since millimeter wave signals are typically more vulnerable to propagation loss than radio signals of longer wavelengths, the usage of directional antennas, i.e. beam forming, is considered, which however requires a mechanism to align the transmitter and the receiver antenna. Approaches allowing the efficient usage of beam forming are therefore desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIG. 7 shows one example of a local search for a receive beam.

FIG. 14 shows a flow diagram illustrating a method for selecting a beam direction.

DETAILED DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
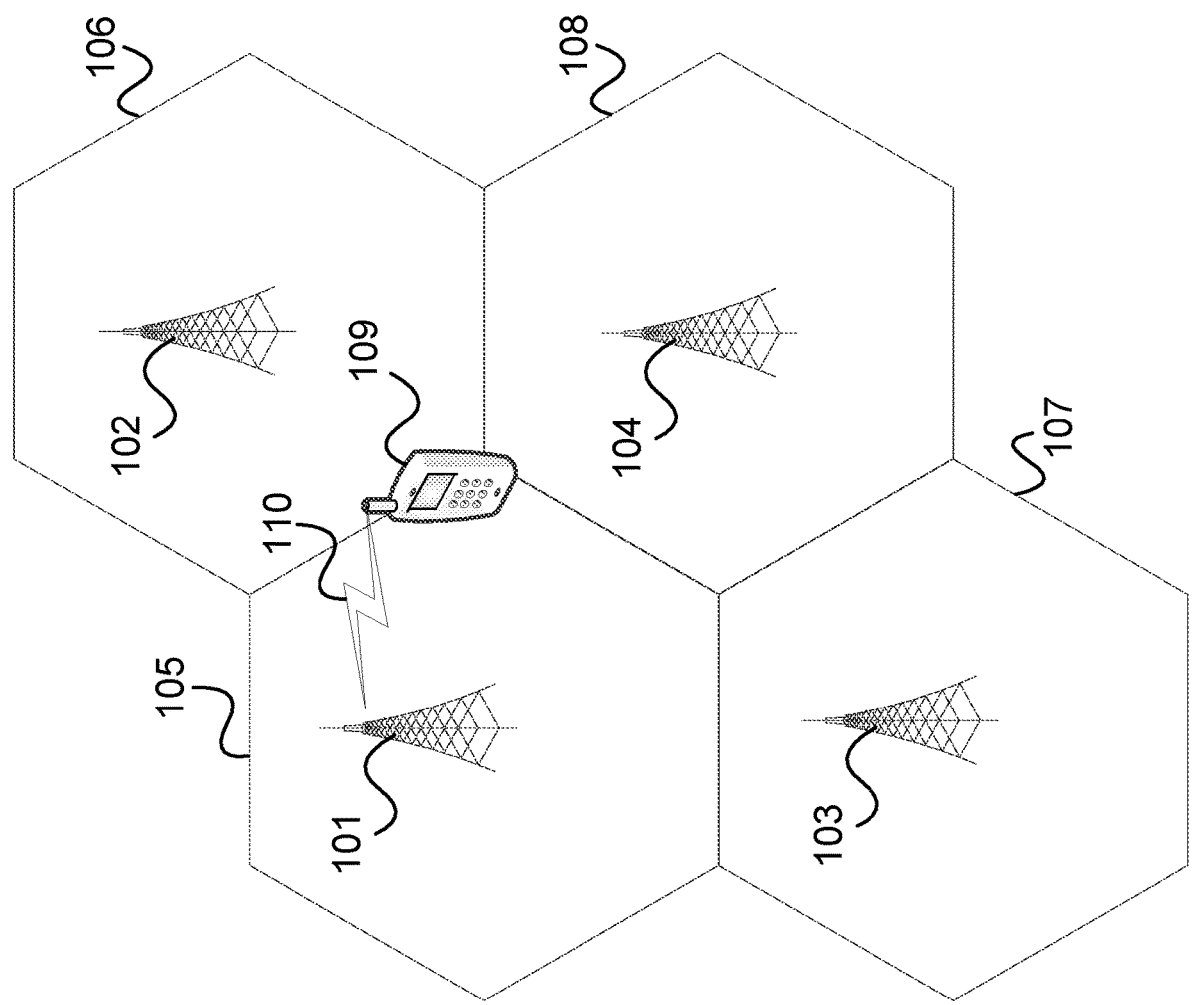
FIG. 1 shows a cellular communication system.

FIG. 1 shows a cellular communication system 100.

The cellular communication system includes a radio access network including a plurality of base stations 101-104, wherein each base station 101-104 operates a radio cell 105-108. A communication terminal (i.e. a subscriber terminal) 109 located in one of the radio cells, in this example a first radio cell 105 operated by a first base station 101, may communicate via a radio communication connection 110 with the first base station 101 to exchange data with the radio access network and for getting access to other networks connected to the radio access network, e.g. a core network of the cellular communication system 100 or the Internet.

There are multiple generations of cellular communication systems, such as 2G GSM (Global System for Mobile Communications), 3G UMTS (Universal Mobile Telecommunications System), and 4G LTE (Long Term Evolution). For the fifth generation, 5G, there are concepts considering significant data throughput improvements by the use of millimeter wave spectrum and large bandwidth carriers. The millimeter wave radio resource may be shared between backhaul, front haul and access links. The millimeter wave technology is intended for spectrum with an absolute radio frequency so high that the spectrum range is well suited to offer very large bandwidths. However, the targeted frequency ranges have difficult propagation conditions, mainly caused by the higher absolute radio frequency and the increased propagation loss, on top we have an atmospheric impact.

Specifically, the increasing demand for multi-gigabit throughput in Personal Area Networks (PANs), together with the advancements in mm-wave silicon circuit technologies make 60 GHz communication a desirable approach, given availability of 7 GHz of license free spectrum at these frequencies. Strong attenuation of mm-wave signals actually supports the opportunity of high density multi-user networks, but introduces a challenge of device connectivity over the ranges of 10 m. The latter may be overcome by using directional transmission, thus making the beam-forming (BF) approach one of the typical key features of such a system.

Figure 2:
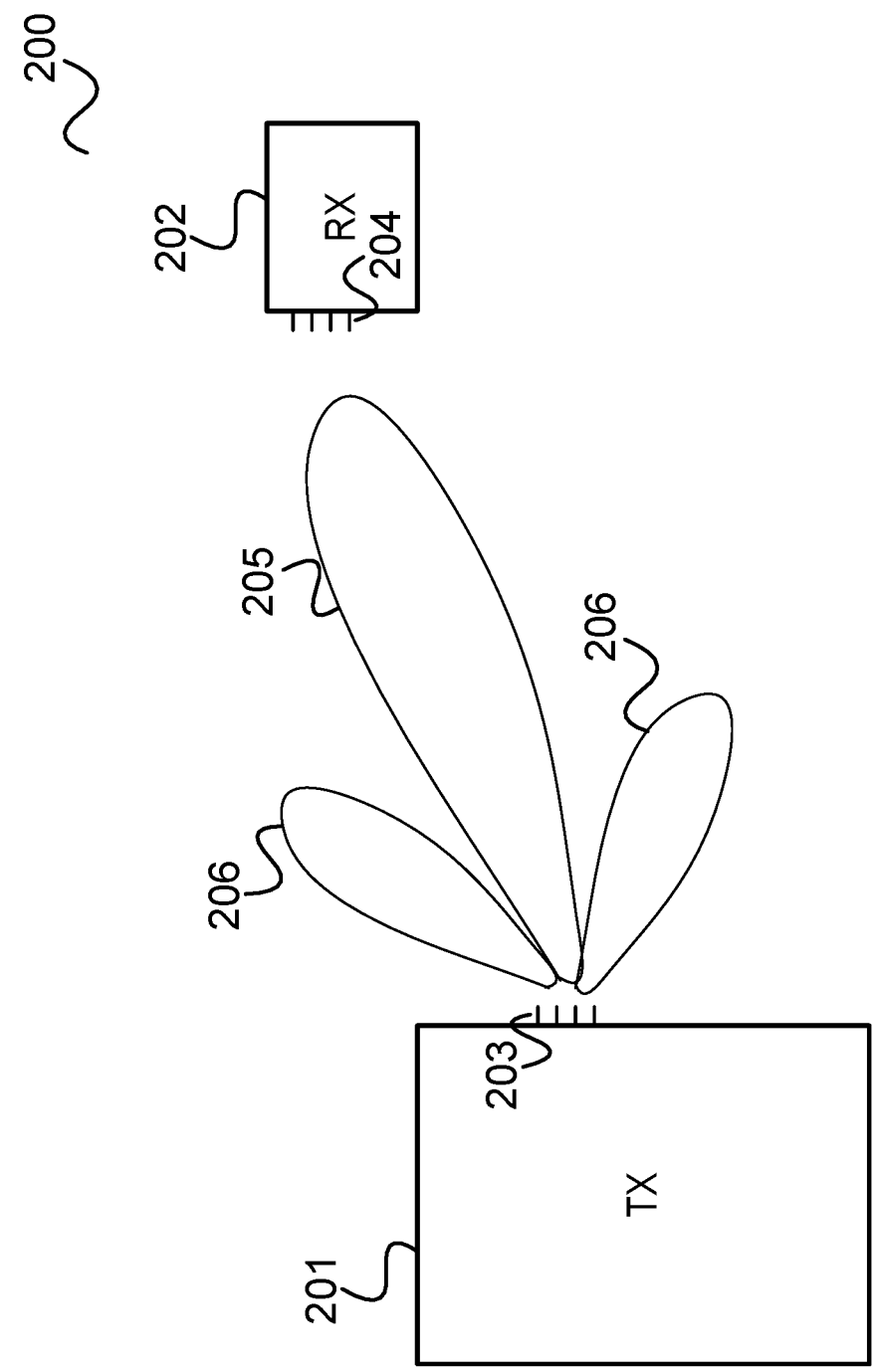
FIG. 2 shows a communication arrangement illustrating directional transmission.

Beamforming is illustrated in FIG. 2.

FIG. 2 shows a communication arrangement 200.

The communication arrangement 200 includes a transmitter 201 (e.g. corresponding to one of the first base station 101 and the communication terminal 109) and a receiver (e.g. corresponding to the other of the first base station 101 and the communication terminal 109).

The transmitter 201 includes a directional transmit antenna 203 formed of a plurality of antennas (exciter elements) and the receiver 202 includes a directional receive antenna 204 formed of a plurality of antennas (exciter elements). By setting a phase shift between the antennas forming transmit antenna 203, the transmitter 201 may perform beam forming for a transmit signal such that the antenna gain strongly depends on the angle under which the transmitter is seen (in other words the signal strength depends on the angle of departure from the transmitter 201). In this example, the gain is very high for the direction of a main lobe 205 (as represented by its size), medium for the direction of side lobes 206 and very small for all other directions. The main lobe 205 is also referred to as main beam direction. Similarly, the receiver 202 may, by setting a phase shift between the antennas forming the receive antenna 204, perform beam forming to make the receive antenna gain dependent from the angle of arrival of a signal.

By beam forming, high antenna gains can be achieved for certain directions. These high antenna gains allow compensating the additional path loss for millimeter waves but require that, in the example of a direct path (i.e. without reflections) as illustrated in FIG. 2, the transmitter (TX) angle of departure (AoD) of the main lobe 205 is perfectly matching the desired receiver (Rx) angle of arrival (AoA), i.e. the angle of arrival for which the receive antenna gain is high. In case of an indirect path, i.e. via a reflection at a certain object, the transmitter (TX) angle of departure (AoD) of the main lobe 205 is to match the direction of the object from the transmitter 201 and the desired receiver (Rx) angle of arrival (AoA) is to match the direction from the object to the receiver 202.

To maximize the possible distance between the transmitter 201 and the receiver 202 both have directional antennas 203, 204. For the application to a cellular communication system, this implies that both the base stations 101-104 as well as the subscriber terminals have directional steerable millimeter wave antennas.

A high gain antenna, such as the transmit antenna 203 and the receive antenna 204 is typically composed of an array of exciter elements and by phase shifting devices and adjustment means for the phase shifts between the exciter elements. The beam (e.g. main lobe 205) can be steered over a certain (angular) range, without mechanical work (by phase shifting). Similarly, the reception pattern of the antenna 204 can be set. This is illustrated in FIG. 3.

Figure 3:
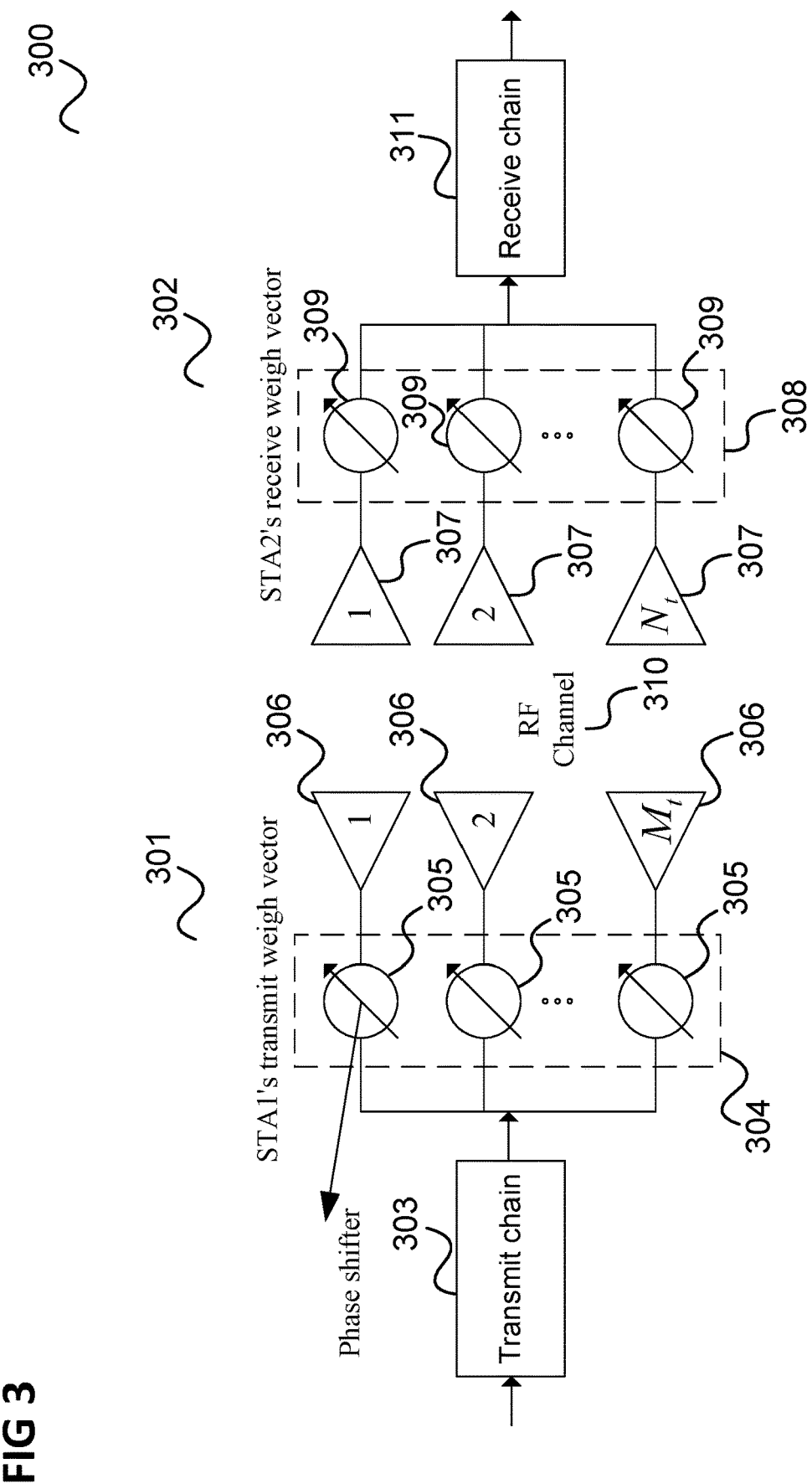
FIG. 3 shows a communication arrangement illustrating beam forming.

FIG. 3 shows a communication arrangement 300.

The communication arrangement 300 includes a transmitter 301, e.g. corresponding to transmitter 201, and a receiver 302, e.g. corresponding to receiver 202.

The transmitter 301 includes a transmit chain 303 via which data to be transmitted are supplied to a transmitter phase shifter array 304. The phase shifter array 304 includes a phase shifter 305 for each transmit antenna 306 of the transmitter 301. Each phase shifter 305 receives a signal corresponding to the data to be transmitted from the transmit chain 303, shifts its phase according to a respective component of a transmit antenna weight vector (AWV) and supplies the phase-shifted signal to the respective transmit antenna 306. Accordingly, by setting a certain transmit antenna weight vector, a certain radiation pattern, e.g. a certain direction of the main beam (referred to as the transmit beam) of the (overall) antenna formed by the transmit antennas 306 can be set.

Analogously, the receiver includes receive antennas 307 and a receiver phase shifter array 308 including a receiver phase shifter 309 for each receive antenna 307. Each receive antenna 307 receives the (overall) signal transmitted by the transmit antennas via the RF channel 310. The receive phase shifters 309 shift the received signals in accordance with a receive antenna weight vector and the results are combined and fed to a receive chain 311.

In a 5G (Fifth Generation) mmWave radio access technology (RAT), a beam reference signal (BRS) may be periodically transmitted by the base station (also referred to as eNodeB) 105-108 to the mobile terminal 109 (also referred to as user equipment, UE) to track and refine the transmit (Tx) beam (i.e. the main beam direction of the sender, e.g. the base station) and the receive (Rx) beam (i.e. the main beam direction of the receiver, e.g. the mobile terminal). The optimal Tx-Rx beam pair typically changes over time. The Rx beam changes faster when the UE 109 is rotating.

Figure 4:
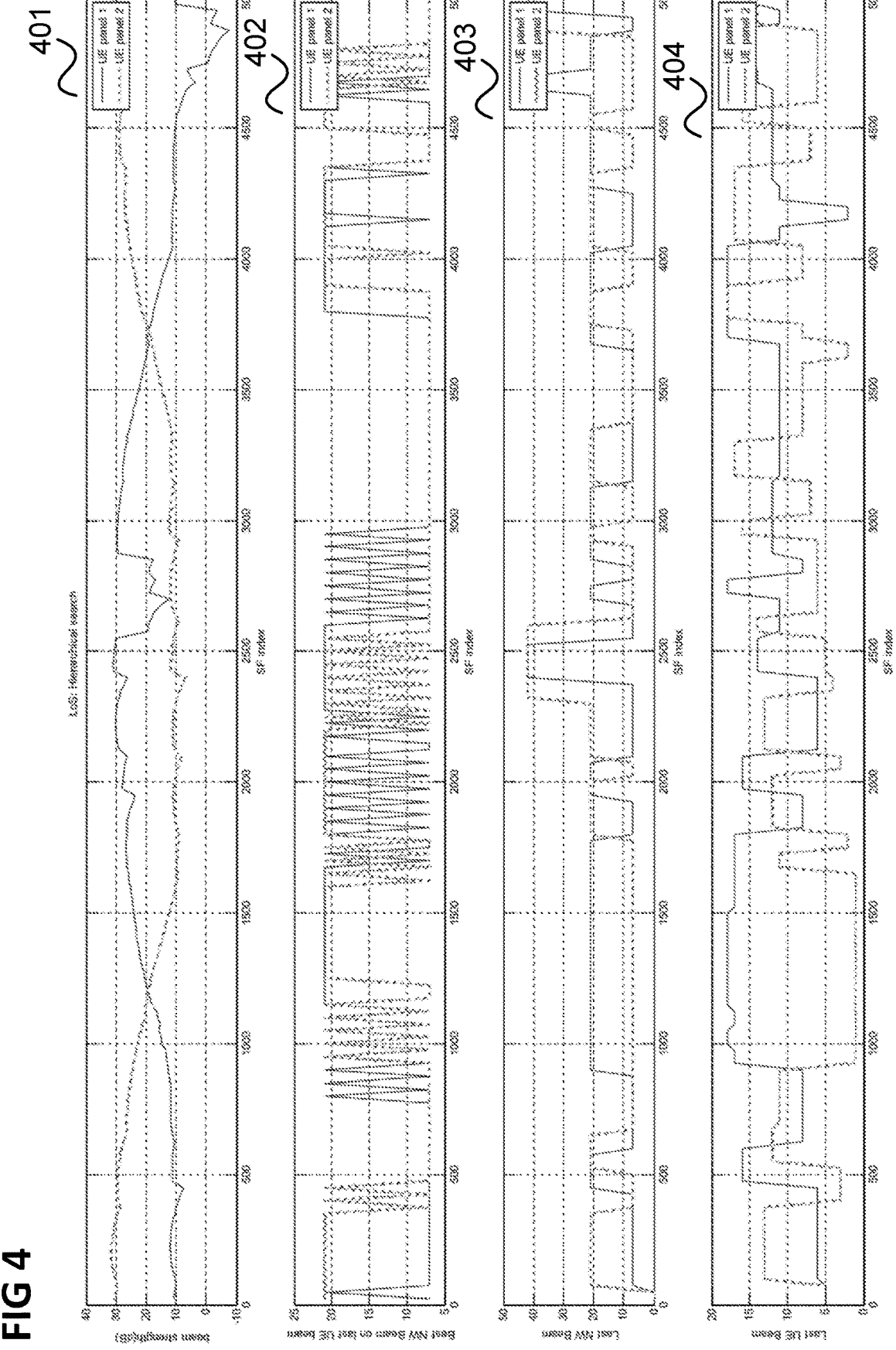
FIG. 4 shows diagrams showing an example of changes of the receive power of a beam reference signal, the index of the corresponding best narrow-width beam, the index of the narrow-width beam and the index of the terminal beam.

FIG. 4 shows a first diagram 401 showing an example of changes of the receive power (beam strength) of BRS (BRS-RP), a second diagram 402 showing the index of the corresponding best narrow-width (NW) transmit beam (e.g. transmit beam if the network side, i.e. the base station, transmits) taking into account the current UE beam (e.g. the receive beam if the terminal side receives), a third diagram 403 showing the index of the narrow-width beam and a fourth diagram 404 showing the index of the terminal beam. For each diagram 401 to 404 time flows from left to right and all diagrams 401 to 404 follow the same time scale. Further, in the example of FIG. 4, it is assumed that the terminal has two antenna panels and each diagram 401 to 404 shows the behavior for each antenna panel.

The index of the Rx beam changes frequently and the BRS-RPs of the two panels fluctuate with the rotation of the UE. For example, UE has determined a receive beam Rx1 and measures the receive power after that. Along with the rotation of UE, or change of the surrounding environment, the best Rx beam may turn into a receive beam Rx2, so that the UE should not use Rx1 for the measurement and the UE needs to search again.

Figure 5:
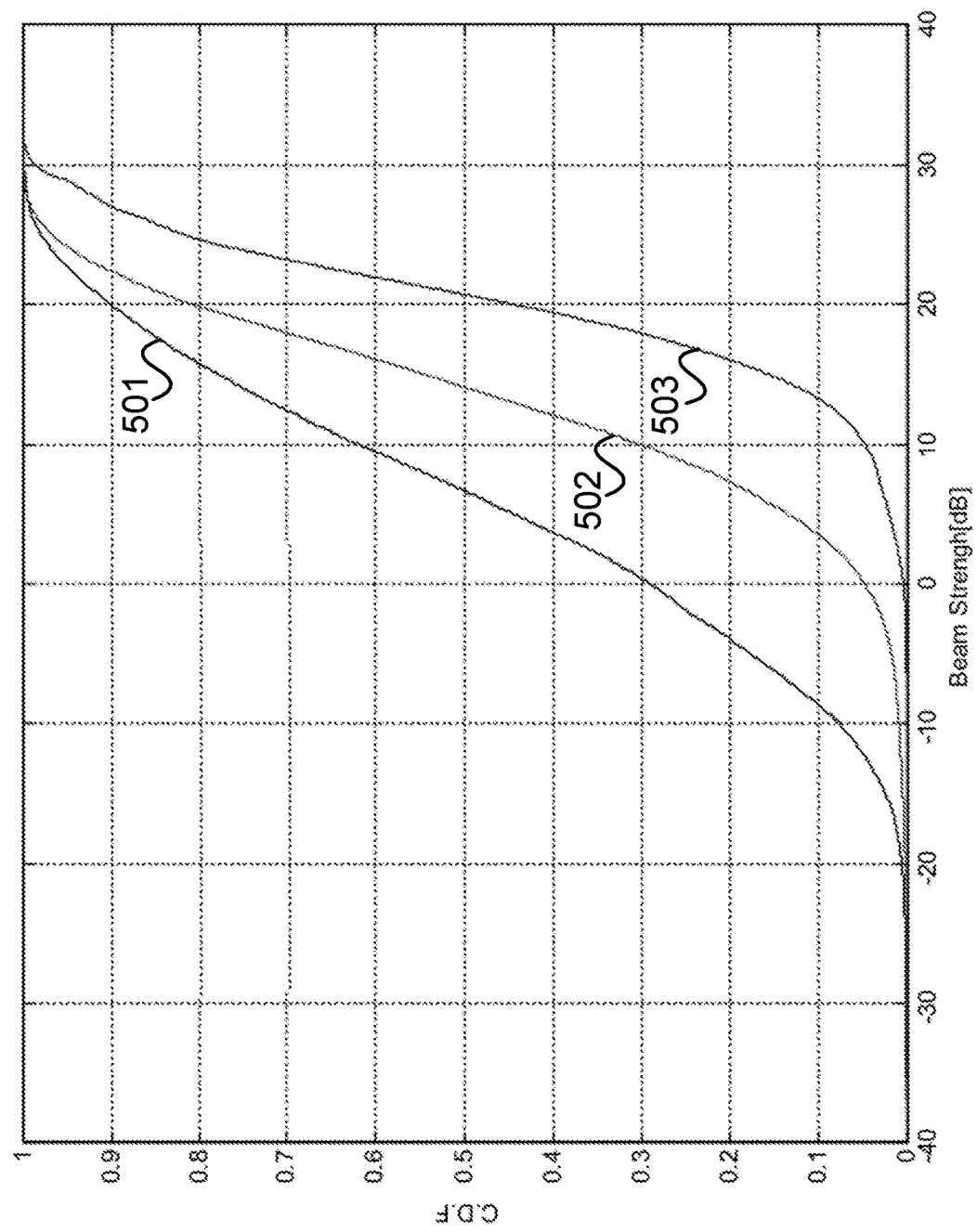
FIG. 5 shows a diagram giving a comparison of the beam strength CDF (cumulative density function) when the mobile terminal rotates and no refinement is used, when the mobile terminal rotates and exhaustive full search for a beam pair is used and when the mobile terminal does not rotate.

FIG. 5 shows a diagram 500 giving a comparison of the beam strength CDF (cumulative density function) when the UE rotates and no refinement (i.e. correction of Tx-Rx beam pair) is used (first graph 501), when the UE rotates and exhaustive full search for the Tx-Rx beam pair is used (second graph 502) and when the UE does not rotate (third graph 503). As can be seen, the rotation of UE causes a big energy loss without any refinement. Therefore, it is desirable for the UE to monitor the change of the best Tx-Rx beam pair and decide whether to do another search in time, especially when the UE is rotating or the surrounding environment is changing. Exhaustive beam search causes a beam energy loss due to its delay.

Therefore, for maintaining performance of a channel to a base station, the UE may typically carry out the following:

Measure BRS-RP of the optimal Tx-Rx beam pair determined last time (i.e. the currently used Tx-Rx beam pair).

Search a new Tx-Rx beam pair and refine when the current Tx-Rx beam pair does not adapt to a change of the channel any longer.

Search candidate Rx beams for the same transmit point (TP), e.g. base station, or different transmit points;

However, in practical application, the UE normally cannot perform these, and possible additional tasks, as for example the measurement, the UE needs to use the optimal Rx beam, but for refining and searching, UE needs to try other Rx beams, i.e. perform measurements for other Rx beams. Accordingly, when the UE is expected to measure the receiver power when the best Rx beam is certain, as well as to adjust its Rx beam in time to catch up with a channel change, the scheduling of those tasks in an efficient manner may become a problem.

In the following, approaches are described for addressing the following when the UE is rotating:

Arranging BRS-RP measurement and beam refinement/search in an efficient manner.

Setting the number of searches (and correspondingly their frequency of occurrence) of Tx-Rx pairs to catch up with the rotation of UE.

Deciding when to change the UE serving panel.

The following examples are described in context of a UE which includes two ports.

Figure 6:
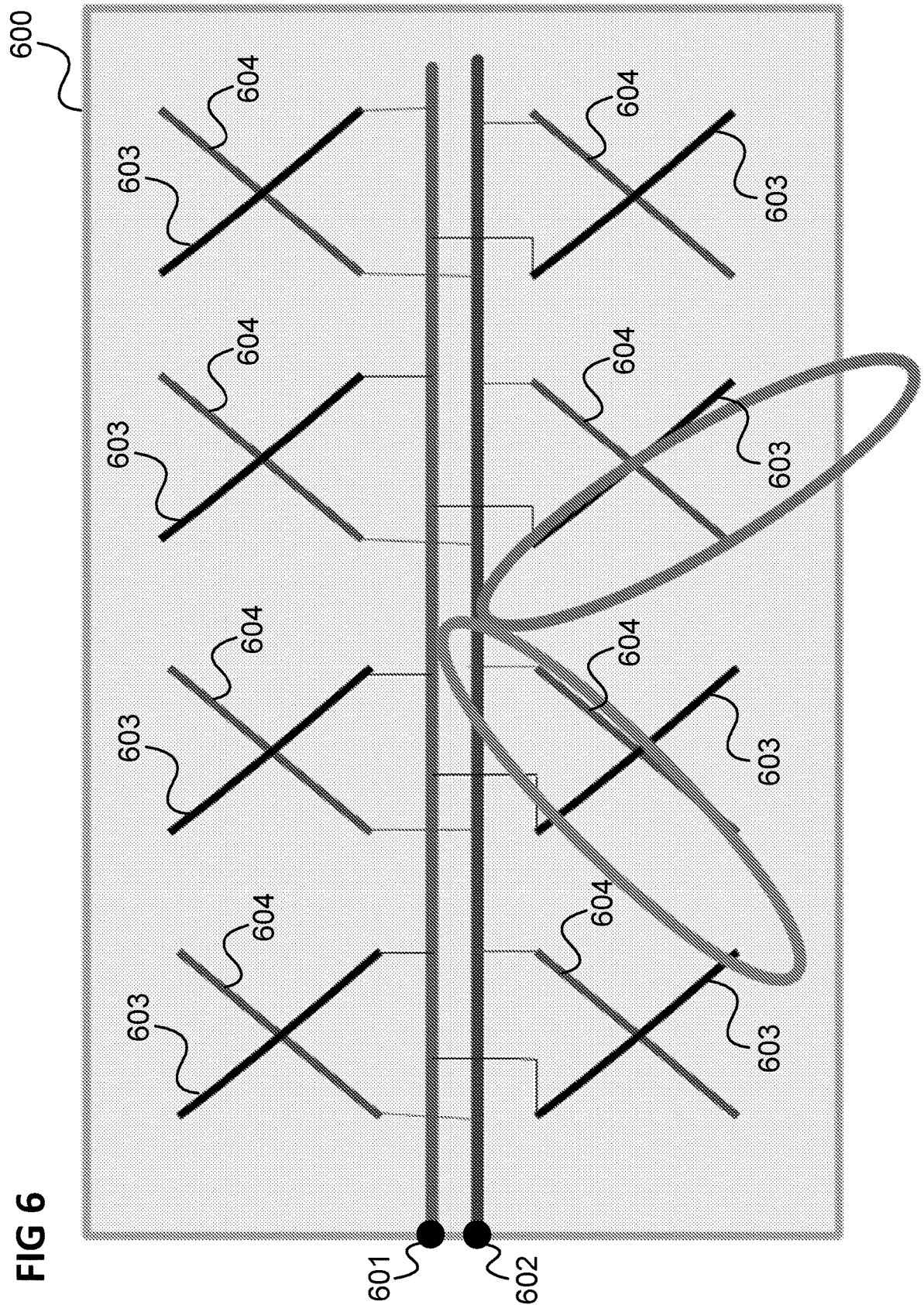
FIG. 6 shows an antenna panel having two ports.

FIG. 6 shows an antenna panel 600 having two ports 601, 602.

The first port 601 is connected to a first plurality of antenna (or exciter) elements 603 arranged in a falling diagonal direction in the representation of FIG. 6 and the second port 602 is connected to a second plurality of antenna (or exciter) elements 604 arranged in a rising diagonal direction in the representation of FIG. 6. The first plurality of antenna elements 603 may be used to generate a first beam 605 and the second plurality of antenna elements 604 may be used to generate a second beam 606, for example Rx beams, as explained with reference to FIG. 3.

As mentioned above, in a 5G mmWave systems, a base station 101-104 may periodically transmit beam reference signal (BRS) such as one BRS transmission every 25 sub frames. The UE 109 may continue to refine or measure the Tx beam and the Rx beam using the BRS. Based on the fact that the best Rx beam tends to change into one of its (spatially) adjacent beams when the UE 109 is rotating, the UE 109 can just refine the Rx beams between the neighbor beams instead of all Rx beams. So, two search schemes may be used in combination:

Global search: According to this, as many as possible Tx-Rx beam pairs are searched, e.g. in an entire set of beam candidates. For this, various search approaches may be used, for example exhaustive full Tx, hierarchical sub Tx search and so on. The UE 109 may perform a global search should be done every once in a while (i.e. after a certain period after the last global search) in case that the channel changes abruptly. The period may be selected depending on the rotation speed of the UE rotating or other factors, and is for example signaled by an upper layer component.

Local search: The UE 109 may use a local search to refine the Rx beam found in the last (local or global) search, e.g. the beam currently used. In the local search, the UE 109 only tries this last best Rx beam and the adjacent Rx beams around it instead of searching all candidate Rx beams. This is applicable to the case when the UE 109 rotates slowly and the UE has known the previous best Rx beam.

FIG. 7 shows one example of a local search for a receive beam when the last best Rx beam is a beam Rx A.

Time flows from left to right and is divided into sub-frames 701, 702, 703. Each sub frame 701, 702, 703 may be divided into several slots. In the example on the left hand side of FIG. 7, the middle sub frame (sub frame k) is divided into three slots 704, 705, 706. The UE 109 measures in the first slot 704 a beam Rx B neighboring Rx A, in the second slot 706 the beam Rx A and in the third slot 706 the beam Rx C, i.e. the UE uses one Rx beam for each slot 704, 705, 706 for BRS reception. It should be noted that changing the Rx beam order in does typically not affect performance.

The UE 109 may also measure more than three Rx beams in one sub frame, e.g. divide the middle sub frame 702 into for slots 707, 709, 709, 710 and measure beams RxA, RxB, RxC and RxD in the middle sub frame 702 as illustrated on the right hand side of FIG. 7.

The beams RxB, RxC and RxD are, as illustrated in the top right of FIG. 7, beams spatially adjacent to RxA among the candidate beam directions.

In order to support measurement of BRS-RP and refinement of Tx-Rx beams over time the UE 109 may for example use one or more of the following mechanisms:

The UE 109 conducts measurements and searches simultaneously via the two receive antenna ports 601, 602 with different Rx beams. For example, the UE 109 may use the first port 601 to measure all Rx beams of a candidate set of Rx beams so as to find the best one periodically. The UE may apply the best Rx beam found by the first port 601 to port 602 to measure the BRS-RP. Alternatively, the UE 109 can use both ports 601, 602 to perform measurement and refinement, but does not use the ports 601, 602 to perform measurement and refinement at the same time.

Since typically, the optimal Rx beam changes gradually and the optimal Tx beam almost does not change with the rotation of UE in a short time and it is more likely that the optimal Rx beam at present is the neighbor of the previous Rx beam, there is no need to do global search continuously and a local search is sufficient. The UE 109 performs global search periodically and the UE 109 only tries the adjacent Rx beams during the interval between global searches (referred to as the global search period).

The global search period may be set depending on the rotation speed of the UE 109 which the UE 190 may for example estimate using a gyroscope of UE. The global search period may for example be signaled to the UE 109 by means of a high layer configuration. Alternatively, the UE 109 may for example determine when to perform a global search based on the variation speed of the BRS-RP measurement of the current beam.

The network side (e.g. via a base station 101 to 104) may configure UE with a global search period regardless of the UE's rotation speed. The network side may request the UE for on a more accurate report from UE based on the knowledge on when it will perform global beam search.

The scope of the local search (e.g. the number of neighboring beams measured) can be fixed or adaptively changed according to the variation of the BRS-RP measurement obtained from the second port 602. For instance, the stronger the BRS-RP measurement varies, the larger scope of the local search can be set.

The network side may further inform the UE 109 about the criteria when to switch the serving panel (assuming the UE 109 includes two (or even more) antenna panels 600), e.g. when to switch the mapping between the virtual port number and physical antenna panel, through high layer configuration. The UE 109 may for example measure the BRS-RP by means of both panels and compare the results to decide whether to change the serving panel. Alternatively, the UE 109 may be configured with a threshold and the BRS-RPs are measured only by the serving panel every sub-frame, wherein the UE 109 changes the serving panel when the measured BRS-RP is lower than the threshold. This approach may also include a UE panel specific counter which indicates how many times the serving panel is no longer applicable, to avoid the influence of abnormal power decrease of the current serving panel.

Figure 8:
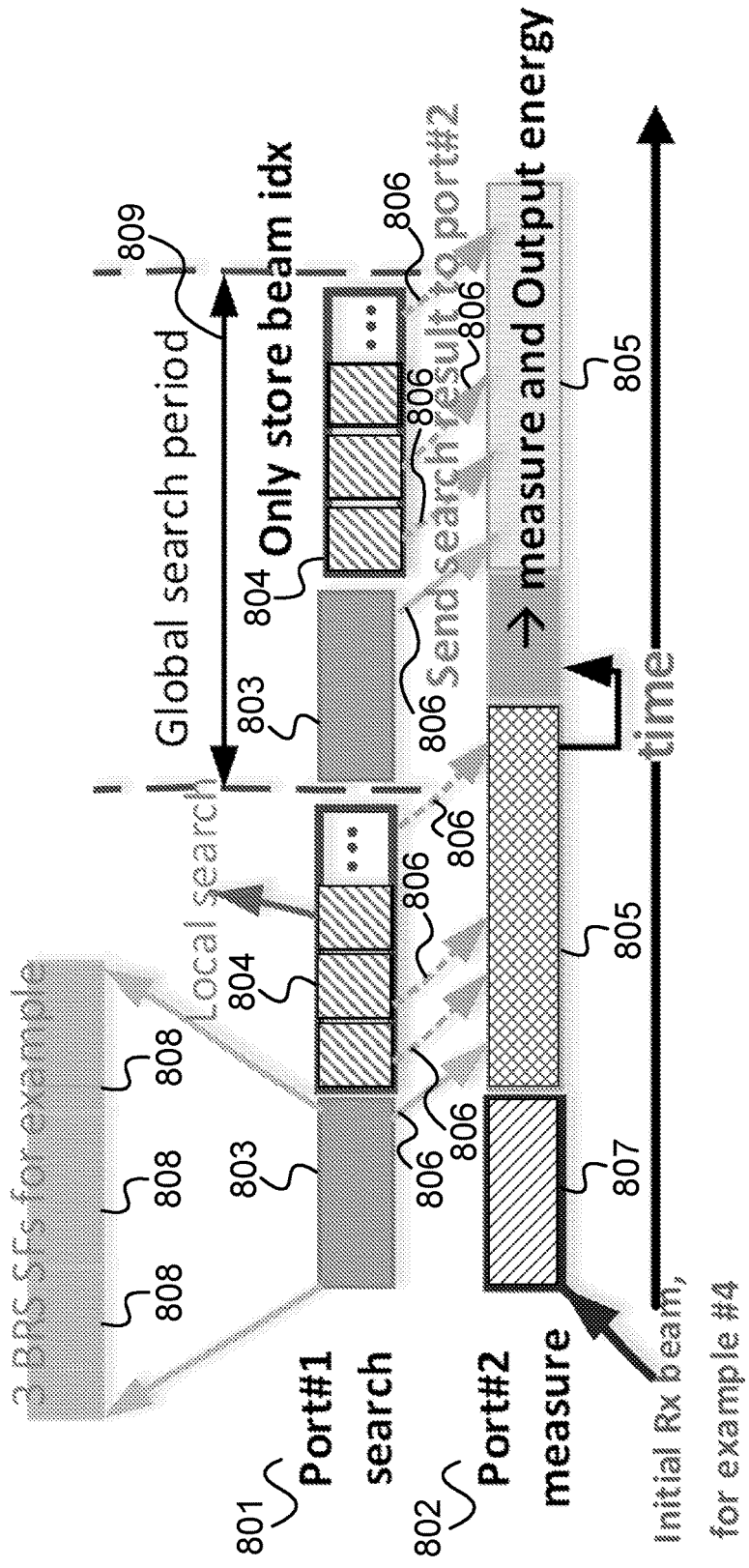
FIG. 8 illustrates an example in which global search and local search are done by a first antenna port and reference signal measurements are performed using a second antenna port.
Figure 9:
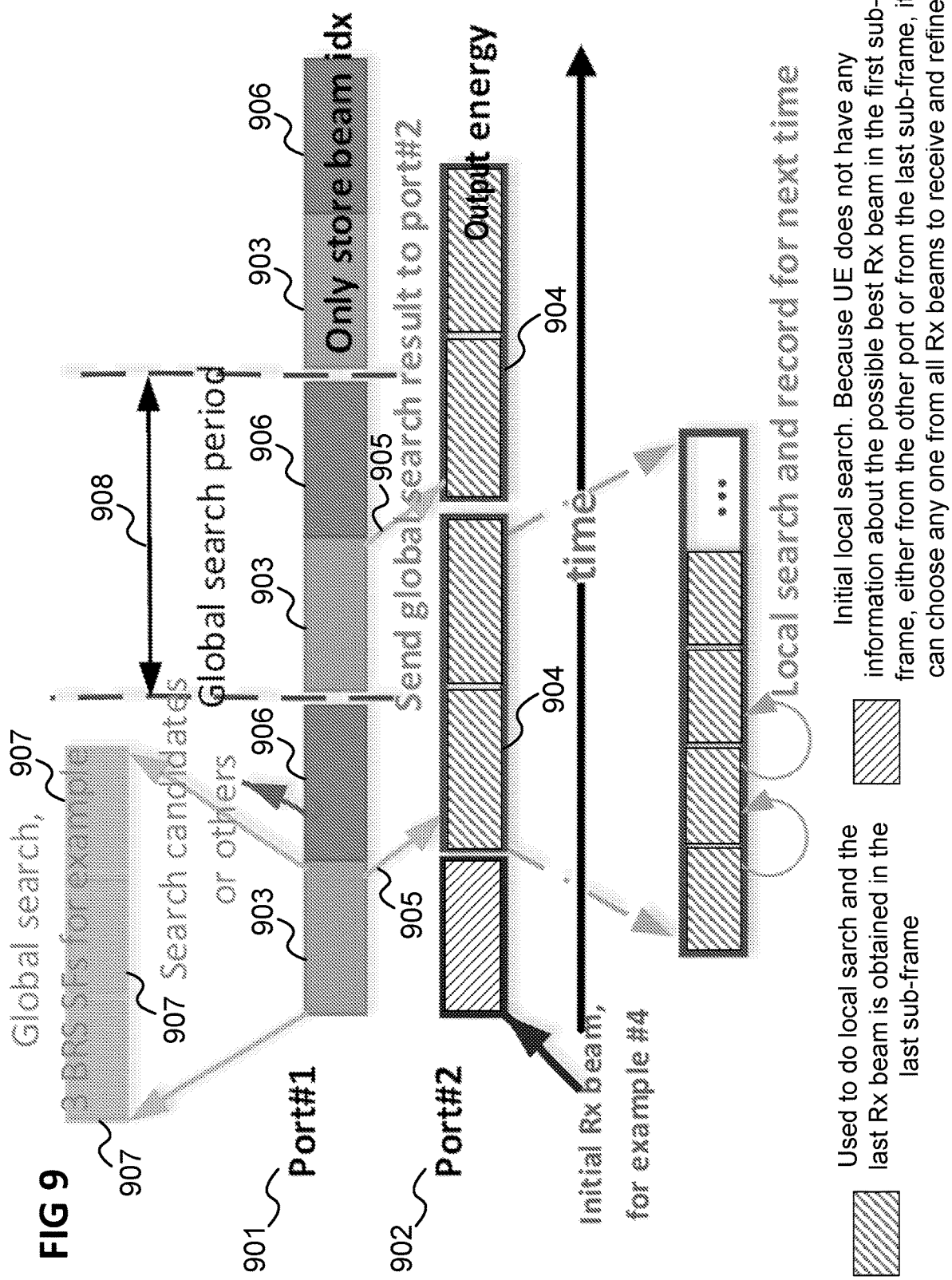
FIG. 9 shows an example in which global search is done by the first antenna port and the refinements are done by the second antenna port.
Figure 10:
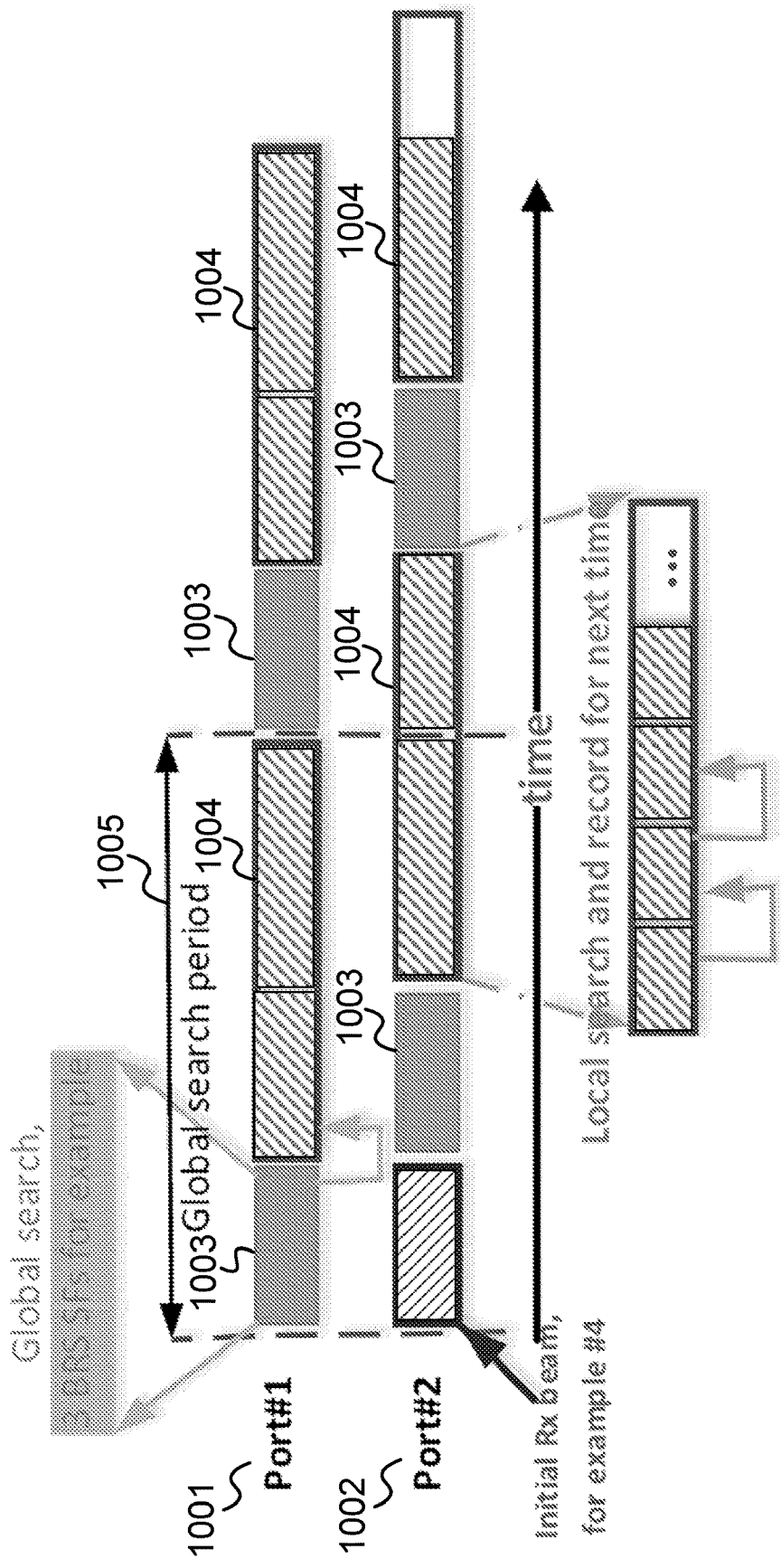
FIG. 10 shows an example in which the mobile terminal performs global search and refinement of beams for each port.

In the following, three approaches are described which allow implementing searching for a beam and measuring a beam at the same time with reference to FIGS. 8 to 10. Each of FIGS. 8 to 10, illustrate the activities of a first port 801, 901, 1001, e.g. corresponding to the first port 601 of the antenna panel 600 of FIG. 6, and of a second port 802, 902, 1002, e.g. corresponding to the second port 602 of the antenna panel 600 of FIG. 6. Time flows from left to right in FIGS. 8 to 10.

FIG. 8 illustrates an example in which global search 803 and local search 804 are done by the first port 801, and the BRS-RP measurements 805 are performed by the second port 802. The second port 802 measures and output the maximum measured energy for the Rx beams determined by the first port 801 as indicated by arrows 806 (e.g. once every sub-frame). The second port 802 may also perform a local search using its Rx beam in sub-frames 807 when it has not yet received information from the first port 801. In this example, the global search 803 has a duration of three sub frames 808. The global search 803 is followed by the local search 804 until the next global search 803. Thus, the global search period 809 is the length of the global search 803 plus the length of the local search 804.

FIG. 9 shows an example in which global search 903 is done by the first port 901 and refinements are performed using the second port 902, i.e. the mobile terminal performs local searches 904 using the second port 902. Specifically, when the first port 901 finishes one global search 903 and sends the best Rx beam to the second port 902 (i.e. the control of the second port 902 is informed about the best Rx beam found in the global search 903 as indicated by arrows 905), for example Rx beam #5, the second port 902 regards it as the best Rx beam and uses Rx beams around it to refine in next sub-frame. The UE 109 may use the unoccupied time blocks 906 of the first port 901 to search for candidate beams or they be reserved for other tasks. Because the candidate beam should be uncorrelated with the best beam, the search process can be shortened by skipping correlated beams.

As in the example of FIG. 8, the global search 903 has a duration of three sub frames 907. The global search period 908 corresponds the duration of the global search 903 plus the duration of the time blocks 906.

In the example of FIG. 9, local search and BRS-RP measurement are combined based on the fact that spatial adjacent Rx beams may have similar BRS-RP measurement results. In the local search 904, the best Rx beams searched by port1 901. So the best Rx beam also has a chance to have a BRS-RP measurement and it will typically not have a big influence if the communication device the replaces measurement results by the local search results. This approach may lead to small errors but it allows reserving time block 906 for other tasks.

FIG. 10 shows an example in which the UE 109 performs global search 1003 and refinement 1004 (i.e. local search) of the best Rx beams founds for each port. It should be noted that when the maximum BRS-RP is determined, the related Rx index and Tx index could also be determined. For Tx beams, they may be transmitted periodically and all of them could be transmitted in every BRS sub frame. Their pattern may be fixed once the eNodeB is configured. The UE can only change its Rx beams and test the corresponding Tx-Rx beam pairs. On the other hand, the change of best Tx beam index is not very strong so this example focuses on the Rx beam.

In this example, neither port gets an indication of candidate beams from the other port. In every global search period 1005, in a first stage, the first port 1001 does a global search 1003 and the second port 1002 does a local search 1004. In a second stage, the first port 1001 does a local search using the best Rx beam found by itself before (in the global search 1003) and the second port does a global search 1003 at the same time. In a third stage within the global search period, both ports 1001, 1002 do a local search 1004. The global search period 1005 should be no shorter than two times the duration of the global search and when it is equal to two times the duration of the global search, the third stage is omitted. Different from the approaches of FIGS. 9 and 10, in which only the maximum energy measured by the second port 802, 902 is output in every sub-frame, according to the approach of FIG. 10, the maximum energy values measured by the two ports 1001, 1002 are compared and the bigger one is output.

Figure 11:
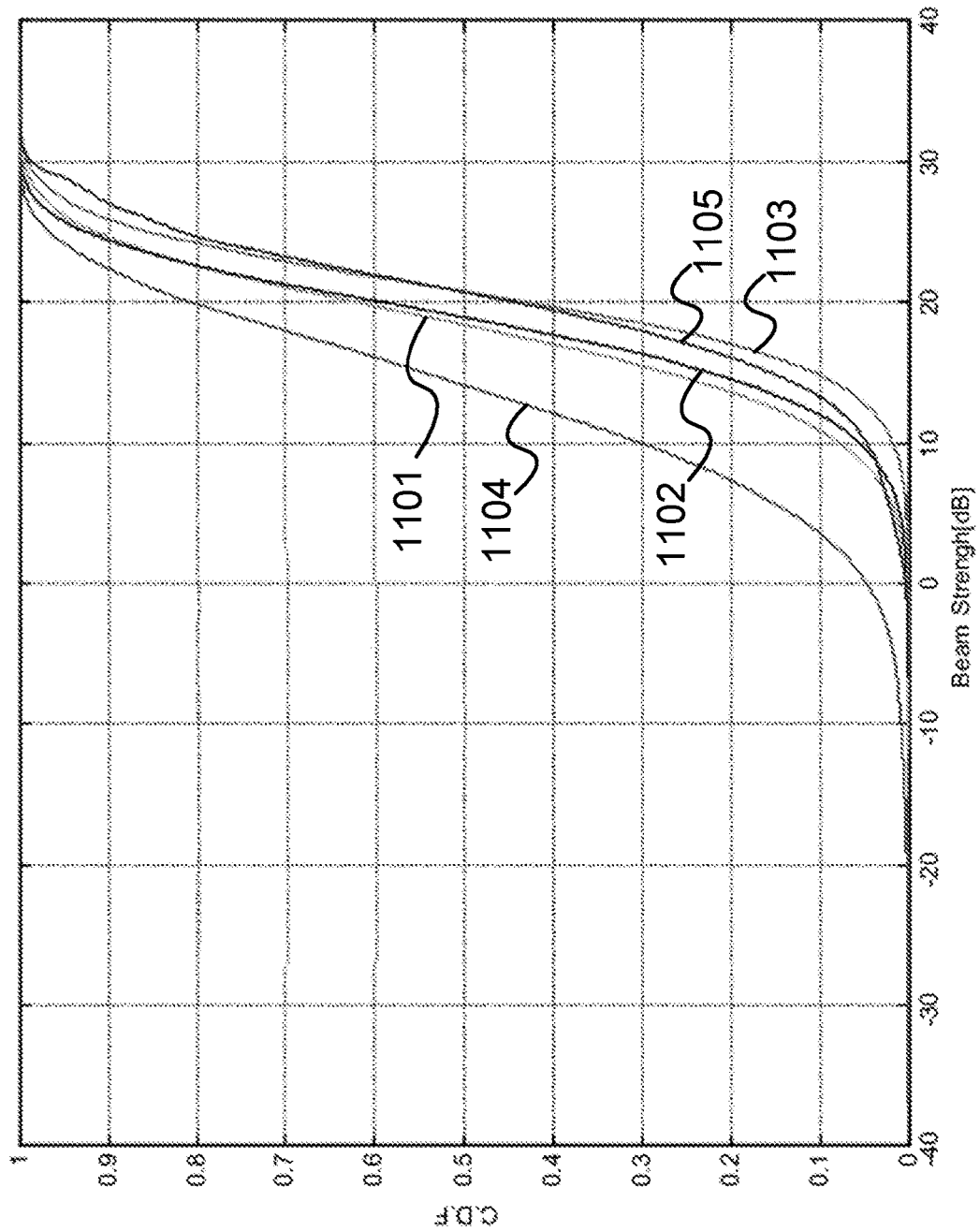
FIG. 11 shows a diagram giving a comparison of the beam strength CDF for the approach of FIG. 8, the approach of FIG. 9 and the approach of FIG. 10 in comparison to an exhaustive full search and the case that the mobile terminal does not rotate.

FIG. 11 shows a diagram 1100 giving a comparison of the beam strength CDF (cumulative density function) for the approach of FIG. 8 in a first curve 1101, the approach of FIG. 9 in a second curve 1102 and the approach of FIG. 10 in a third curve 1103 in comparison to an exhaustive full search in a fourth curve 1104 and the case that the UE does not rotate in a fifth curve 1105.

As can be seen, the beam receive energy increases significantly by using the approaches of FIGS. 8 to 10 and they have little loss compared to the case when UE does not rotate.

The global search period 809, 908, 1005 may be set as follows. It is assumed that that the eNodeB 101 to 104 transmits a BRS every T seconds and that the UE 109 rotates x degrees every second. The horizontal angle difference between adjacent Rx beams is denoted as D. Then the number of BRS-SFs of the global search period may be set as $$N = \left\lceil \eta \frac{D}{xT} \right\rceil$$

wherein η∈[1,2] is a suitable chosen coefficient.

Figure 12:
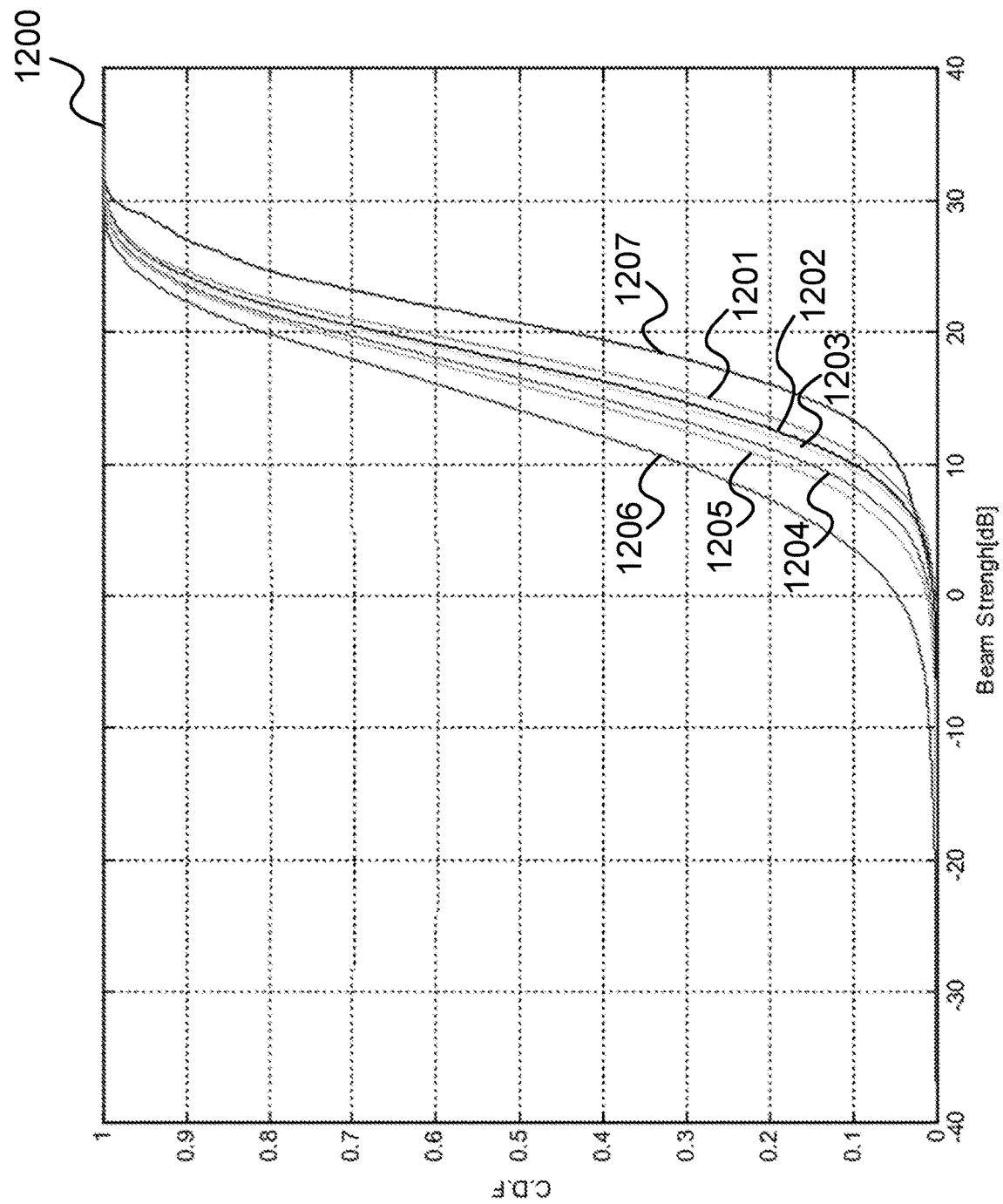
FIG. 12 shows a diagram giving a comparison of the beam strength CDF for the approach of FIG. 8 with a global search period of 6 BRS sub frames, a global search period of 12 BRS sub frames, a global search period of 18 BRS sub frames, a global search period of 36 BRS sub frames, a global search period of 50 BRS sub frames in comparison to an exhaustive full search and the case that the UE does not rotate.

FIG. 12 shows a diagram 1200 giving a comparison of the beam strength CDF (cumulative density function) for the approach of FIG. 8 with a global search period of 6 BRS sub frames in a first curve 1201, a global search period of 12 BRS sub frames in a second curve 1202, a global search period of 18 BRS sub frames in a third curve 1203, a global search period of 36 BRS sub frames in a fourth curve 1204, a global search period of 50 BRS sub frames in a fifth curve 1205 in comparison to an exhaustive full search in a sixth curve 1206 and the case that the UE does not rotate in a seventh curve 1207. Table 1 gives some corresponding values. It should be noted that the global search period is defined as N BRS sub frames (rather than the normal sub frames according to the frame structure used for communication). A BRS sub frame is a sub frame which carries BRS information. For example, the period of BRS sub frames is 25 (normal) sub frames, i.e., sub frame No. 0, 25, 50 . . . of the radio frame structure used are BRS sub frames.

TABLE 1

| N [BRS SFs] | 5% CDF [dB] |
|---|---|
| Do not rotate | 10.49 |
| 6 | 8.56 |
| 12 | 7.74 |
| 18 | 7.21 |
| 36 | 6.01 |
| 50 | 4.69 |

Apparently, increasing the global search period degrades performance. Similar results can be expected for the approach of FIG. 9. However performance when changing period does not have a strong impact when using the approach of FIG. 10.

Figure 13:
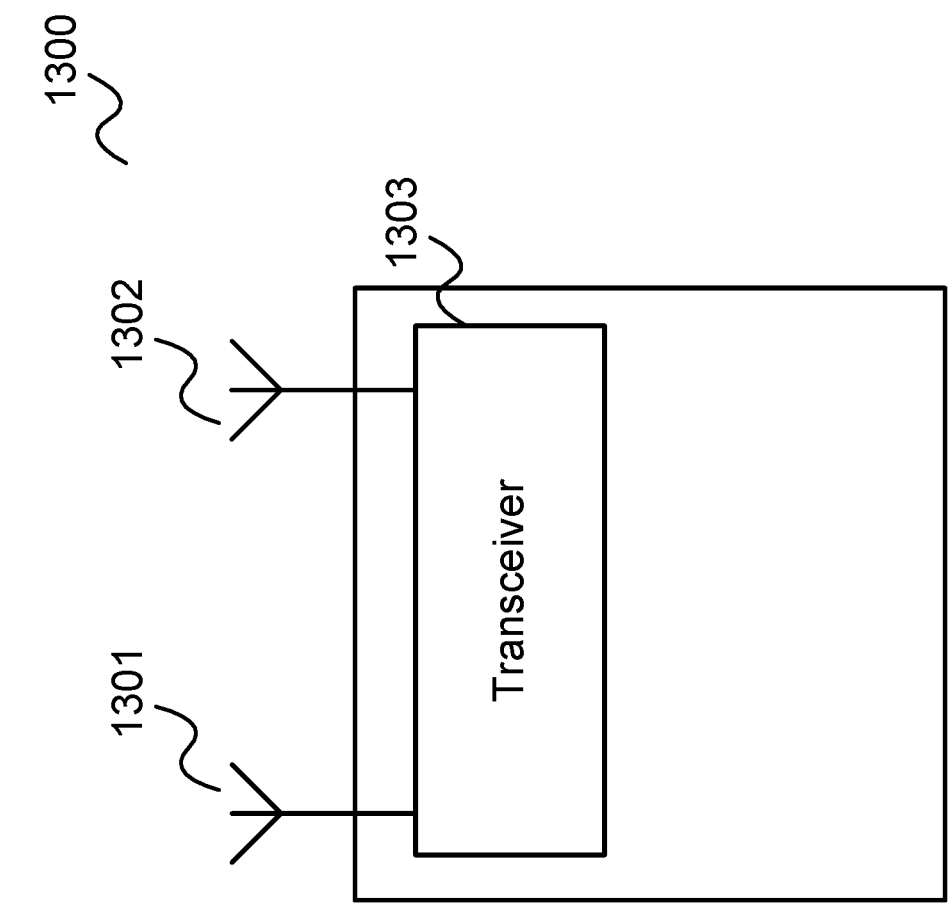
FIG. 13 shows a communication device.

In summary, according to various examples, a communication device is provided as illustrated in FIG. 13.

FIG. 13 shows a communication device 1300.

The communication device 1300 includes a first directional antenna 1301 and a second directional antenna 1302 which may each be set to any one of a plurality of main beam directions for radio communication.

The communication device 1300 further includes a transceiver 1303 configured to determine a reception quality for at least some of the plurality of main beam directions using the first directional antenna and for at least some of the plurality of main beam directions using the second directional antenna, to select a main beam direction of the plurality of main beam directions based on the reception qualities determined by the first directional antenna and based on the reception qualities determined by the second directional antenna and to perform communication using the selected main beam direction.

According to various examples, in other words, a communication device uses both of two directional antennas (e.g. each directional antenna corresponding to one part of an overall antenna, e.g. an antenna panel) for performing measurements or searches of beam directions (e.g. receive beam directions or, alternatively possibly also transmit beam directions) for a communication. The communication device selects a beam direction for communication based on the results of measurements or searches (together generally referred to as determinations of a reception quality herein, e.g. based on a reference signal) performed by (i.e. by means of) the first antenna (i.e. corresponding to a first antenna port of an antenna panel) and those performed by (i.e. by means of) the second antenna port (e.g. corresponding to a second antenna port of the antenna panel). In other words, the combination the results of measurements or searches from both antenna ports.

The components of the communication device (e.g. the transceiver) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

The communication device 1300 for example carries out a method as illustrated in FIG. 14.

FIG. 14 shows a flow diagram 1400 illustrating a method for selecting a beam direction, for example carried out by a communication device.

In 1401, the communication device determines a reception quality for at least some of a plurality of main beam directions using a first directional antenna and for at least some of the plurality of main beam directions using a second directional antenna, wherein the first directional antenna and the second directional antenna may each be set to any one of the plurality of main beam directions for radio communication.

In 1402, the communication device selects a main beam direction of the plurality of main beam directions based on the reception qualities determined by the first directional antenna and based on the reception qualities determined by the second directional antenna.

In 1403, the communication device performs communication using the selected main beam direction.

The following are additional examples of aspects of the present disclosure.

Example 1 is a communication device as shown in FIG. 13.

In Example 2, the subject-matter of Example 1 may optionally include the communication device being configured to perform communication using the selected main beam direction and using at least one of the first directional antenna and the second directional antenna.

In Example 3, the subject-matter of any one of Examples 1-2 may optionally include the transceiver being configured to determine the reception quality for a first main beam direction of the plurality of main beam directions using the first directional antenna and to determine the reception quality for a second main beam direction of the plurality of main beam directions using the second directional antenna simultaneously.

In Example 4, the subject-matter of any one of Examples 1-3 may optionally include the transceiver being configured to determine the reception quality for a main beam direction by receiving a signal using the first directional antenna or the second directional antenna set to the main beam direction.

In Example 5, the subject-matter of any one of Examples 1-4 may optionally include the reception quality being a quality of reception of a beam reference signal.

In Example 6, the subject-matter of any one of Examples 1-5 may optionally include the reception quality being a reception strength of a beam reference signal.

In Example 7, the subject-matter of any one of Examples 1-6 may optionally include the transceiver being configured to perform radio communication using a first main beam direction of the plurality of main beam directions and the transceiver being configured to determine the reception quality for the first main beam direction and to determine the reception quality for at least one second main beam direction of the plurality of main beam directions.

In Example 8, the subject-matter of Example 7 may optionally include the at least one second main beam directions being a main beam direction spatially adjacent to the first main beam direction among the plurality of main beam directions.

In Example 9, the subject-matter of any one of Examples 7-8 may optionally include the transceiver being configured to determine the reception quality for the first main beam direction using the first directional antenna and to determine the reception quality for the at least one second main beam direction using the second directional antenna.

In Example 10, the subject-matter of any one of Examples 7-9 may optionally include the transceiver being configured to determine the reception quality for the first main beam direction and to determine the reception quality for at least one second main beam direction of the plurality of main beam directions simultaneously.

In Example 11, the subject-matter of any one of Examples 1-10 may optionally include radio communication comprising at least one of radio transmission to another communication device and radio reception from another communication device.

In Example 12, the subject-matter of any one of Examples 1-11 may optionally include the first directional antenna comprising a plurality of first antenna elements and the second directional antenna comprising a plurality of second antenna elements.

In Example 13, the subject-matter of any one of Examples 1-12 may optionally include each main beam direction corresponding to a respective antenna weight vector comprising an antenna weight for each of the first antenna elements and each main beam direction corresponding to a respective antenna weight vector comprising an antenna weight for each of the second antenna elements.

In Example 14, the subject-matter of any one of Examples 1-13 may optionally include an antenna panel comprising the first directional antenna and the second directional antenna.

In Example 15, the subject-matter of Example 14 may optionally include the antenna panel comprising a first antenna port connected to the first directional antenna and a second antenna port connected to the second directional antenna.

In Example 16, the subject-matter of Example 15 may optionally include the antenna panel being an antenna panel of a plurality of antenna panels and the transceiver being configured to select an antenna panel of the plurality of antenna panels for communication.

In Example 17, the subject-matter of any one of Examples 1-16 may optionally include the transceiver being configured to search for a main beam direction for radio communication by determining the reception quality for at least some of the plurality of main beam directions using the first directional antenna and the second directional antenna.

In Example 18, the subject-matter of Example 17 may optionally include the transceiver being configured to refine the search for a main beam direction for radio communication by determining the reception quality for the main beam direction using the first directional antenna or the second directional antenna.

In Example 19, the subject-matter of any one of Examples 17-18 may optionally include the transceiver being configured to determine the reception quality using the second directional antenna of a main beam direction found by means of determining the reception quality of the main beam direction using the first directional antenna.

In Example 20, the subject-matter of any one of Examples 17-19 may optionally include the transceiver being configured to refine the search for a main beam direction for radio communication by determining the reception quality using the second directional antenna of a main beam direction found by means of determining the reception quality of the main beam direction using the first directional antenna.

In Example 21, the subject-matter of any one of Examples 1-20 may optionally include the transceiver being configured to perform a local search by determining a reception quality for each of some of the plurality of main beam directions using at least one of the first directional antenna and the second directional antenna.

In Example 22, the subject-matter of any one of Examples 1-21 may optionally include the transceiver being configured to, for each of at least some of the plurality of main beam directions, perform a first reception signal quality measurement using the first directional antenna and perform a second reception signal quality measurement using the second directional antenna.

In Example 23, the subject-matter of any one of Examples 1-22 may optionally include, for a main beam direction for which the transceiver has determined a first reception signal quality using the first directional antenna and for which the transceiver has determined a second reception signal quality using the second directional antenna, the transceiver being configured to compare the first reception quality and the second reception quality and select a main beam direction of the plurality of main beam directions based on a result of the comparison.

Example 24 being a method for selecting a beam direction as illustrated in FIG. 14.

In Example 25, the subject-matter of Examples 24 may optionally include performing communication using the selected main beam direction and using at least one of the first directional antenna and the second directional antenna.

In Example 26, the subject-matter of any one of Examples 24-25 may optionally include determining the reception quality for a first main beam direction of the plurality of main beam directions using the first directional antenna and to determine the reception quality for a second main beam direction of the plurality of main beam directions using the second directional antenna simultaneously.

In Example 27, the subject-matter of any one of Examples 24-26 may optionally include determining the reception quality for a main beam direction by receiving a signal using the first directional antenna or the second directional antenna set to the main beam direction.

In Example 28, the subject-matter of any one of Examples 24-27 may optionally include the reception quality being a quality of reception of a beam reference signal.

In Example 29, the subject-matter of any one of Examples 24-28 may optionally include the reception quality being a reception strength of a beam reference signal.

In Example 30, the subject-matter of any one of Examples 24-29 may optionally include performing radio communication using a first main beam direction of the plurality of main beam directions and comprising determining the reception quality for the first main beam direction and comprising determining the reception quality for at least one second main beam direction of the plurality of main beam directions.

In Example 31, the subject-matter of Example 30 may optionally include the at least one second main beam directions being a main beam direction spatially adjacent to the first main beam direction among the plurality of main beam directions.

In Example 32, the subject-matter of any one of Examples 30-31 may optionally include determining the reception quality for the first main beam direction using the first directional antenna and comprising determining the reception quality for the at least one second main beam direction using the second directional antenna.

In Example 33, the subject-matter of any one of Examples 30-32 may optionally include determining the reception quality for the first main beam direction and comprising determining the reception quality for at least one second main beam direction of the plurality of main beam directions simultaneously.

In Example 34, the subject-matter of any one of Examples 24-33 may optionally include radio communication comprising at least one of radio transmission from a communication device to another communication device and radio reception by the communication device from another communication device.

In Example 35, the subject-matter of any one of Examples 24-34 may optionally include the first directional antenna comprising a plurality of first antenna elements and the second directional antenna comprising a plurality of second antenna elements.

In Example 36, the subject-matter of any one of Examples 24-35 may optionally include each main beam direction corresponding to a respective antenna weight vector comprising an antenna weight for each of the first antenna elements and each main beam direction corresponding to a respective antenna weight vector comprising an antenna weight for each of the second antenna elements.

In Example 37, the subject-matter of any one of Examples 24-36 may optionally include an antenna panel comprising the first directional antenna and the second directional antenna.

In Example 38, the subject-matter of Example 37 may optionally include the antenna panel comprising a first antenna port connected to the first directional antenna and a second antenna port connected to the second directional antenna.

In Example 39, the subject-matter of Example 38 may optionally include the antenna panel being an antenna panel of a plurality of antenna panels and the transceiver being configured to select an antenna panel of the plurality of antenna panels for communication.

In Example 40, the subject-matter of any one of Examples 24-39 may optionally include searching for a main beam direction for radio communication by determining the reception quality for at least some of the plurality of main beam directions using the first directional antenna and the second directional antenna.

In Example 41, the subject-matter of Example 40 may optionally include refining the search for a main beam direction for radio communication by determining the reception quality for the main beam direction using the first directional antenna or the second directional antenna.

In Example 42, the subject-matter of any one of Examples 40-41 may optionally include determining the reception quality using the second directional antenna of a main beam direction found by means of determining the reception quality of the main beam direction using the first directional antenna.

In Example 43, the subject-matter of any one of Examples 40-42 may optionally include refining the search for a main beam direction for radio communication by determining the reception quality using the second directional antenna of a main beam direction found by means of determining the reception quality of the main beam direction using the first directional antenna.

In Example 44, the subject-matter of any one of Examples 24-43 may optionally include performing a local search by determining a reception quality for each of some of the plurality of main beam directions using at least one of the first directional antenna and the second directional antenna.

In Example 45, the subject-matter of any one of Examples 24-44 may optionally include, for each of at least some of the plurality of main beam directions, performing a first reception signal quality measurement using the first directional antenna and performing a second reception signal quality measurement using the second directional antenna.

In Example 46, the subject-matter of any one of Examples 24-45 may optionally include, for a main beam direction for which a first reception signal quality has been determined using the first directional antenna and for which a second reception signal quality has been determined using the second directional antenna, comparing the first reception quality and the second reception quality and selecting a main beam direction of the plurality of main beam directions based on a result of the comparison.

Example 47 is a computer readable medium having recorded instructions thereon which, when executed by a processor, make the processor perform a method for selecting a beam direction according to any one of Examples 24 to 46.

According to further examples, a system and a method of wireless communication for a fifth generation network are provided comprising, receiving, by the UE, beamforming reference signal (BRS) using multiple beamformed antenna ports in one OFDM (Orthogonal Frequency Divisions Multiplexing) symbol using one/or multiple UE beams and measuring, by the UE, the BRS receiving power (BRS-RP) using the best UE beam(s).

According to an example, the UE may use the same beam to receive multiple BRS OFDM symbols in order to derive the receiving signal quality of one UE beam.

According to an example, the UE may perform a global search by using N BRS OFDM symbols to determine which is a global optimal UE beam.

According to an example, the UE may perform local search by using M (M<N) BRS OFDM symbols to determine which is a local optimal UE beam given apriori global optimal UE beam information.

According to an example, the UE may alternatively use global search and local search to adapt to the best tradeoff between performance and search latency.

According to an example, the UE may perform global search on one UE antenna port and local search on the other UE antenna port.

According to an example, the UE may use the global search result of one antenna port as apriori information for the local search of the other antenna port.

According to an example, the UE may use a best UE beam to receive BRS subframe if it receives signalling from the network indicating it to report BRS-RP.

According to an example, UE may only use the best UE beam for one antenna port to measure BRS-RP and the other antenna port to search other UE beams.

According to a further example, a communication device is provided having an antenna panel having a first directional antenna port and a second directional antenna port, which may each be set to any one of a plurality of main beam directions for radio communication. The communication device further includes a transceiver configured to determine a reception quality for at least some of the plurality of main beam directions using the first directional antenna port and for at least some of the plurality of main beam directions using the second directional antenna port, select a main beam direction of the plurality of main beam directions based on the reception qualities determined by the first directional antenna port and based on the reception qualities determined by the second directional antenna port and perform communication using the selected main beam direction using the antenna panel.

It should be noted that one or more of the features of any of the examples above may be combined with any one of the other examples.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A communication device comprising:
   a first directional antenna and a second directional antenna which may each be set to any one of a plurality of main beam directions for radio communication; and
   a transceiver configured to
      determine a reception quality for at least some of the plurality of main beam directions using the first directional antenna;
      select a main beam direction of the plurality of main beam directions based on the reception qualities determined by the first directional antenna;
      perform communication using the selected main beam direction via the first directional antenna; and
      determine a reception quality for the selected main beam direction and adjacent main beam directions via the second directional antenna.

2. The communication device of claim 1, wherein the transceiver is configured to determine the reception quality for a first main beam direction of the plurality of main beam directions using the first directional antenna and to determine the reception quality for the selected main beam direction and adjacent main beam directions using the second directional antenna simultaneously.

3. The communication device of claim 1, wherein the transceiver is configured to determine the reception quality for a main beam direction by receiving a signal using the first directional antenna or the second directional antenna set to the main beam direction.

4. The communication device of claim 1, wherein the reception quality is a quality of reception of a beam reference signal or a reception strength of a beam reference signal.

5. The communication device of claim 1, wherein the transceiver is configured to perform radio communication using a first main beam direction of the plurality of main beam directions and the transceiver is configured to determine the reception quality for the first main beam direction and to determine the reception quality for at least one second main beam direction of the plurality of main beam directions, wherein the at least one second main beam directions is a main beam direction spatially adjacent to the first main beam direction among the plurality of main beam directions.

6. The communication device of claim 1, wherein the transceiver is configured to determine the reception quality for the first main beam direction using the first directional antenna and to determine the reception quality for at least one second main beam direction using the second directional antenna.

7. The communication device of claim 1, wherein radio communication comprises at least one of radio transmission to another communication device and radio reception from another communication device.

8. The communication device of claim 1, wherein the first directional antenna comprises a plurality of first antenna elements and the second directional antenna comprises a plurality of second antenna elements.

9. The communication device of claim 8, wherein each main beam direction corresponds to a respective antenna weight vector comprising an antenna weight for each of the first antenna elements and each main beam direction corresponds to a respective antenna weight vector comprising an antenna weight for each of the second antenna elements.

10. The communication device of claim 1, comprising an antenna panel comprising the first directional antenna and the second directional antenna.

11. The communication device of claim 10, wherein the antenna panel comprises a first antenna port connected to the first directional antenna and a second antenna port connected to the second directional antenna.

12. The communication device of claim 11, wherein the antenna panel is an antenna panel of a plurality of antenna panels and the transceiver is configured to select an antenna panel of the plurality of antenna panels for communication.

13. The communication device of claim 1, wherein the transceiver is configured to search for a main beam direction for radio communication by determining the reception quality for at least some of the plurality of main beam directions using the first directional antenna and the second directional antenna.

14. The communication device of claim 13, wherein the transceiver is configured to refine the search for a main beam direction for radio communication by determining the reception quality for the main beam direction using the first directional antenna or the second directional antenna.

15. The communication device of claim 1, wherein the transceiver is configured to receive a reference signal using the first directional antenna and the second directional antenna in an Orthogonal Frequency Division Multiplexing (OFDM) symbol using the plurality of main beam directions.

16. The communication device of claim 15, wherein the reference signal is a beamforming reference signal (BRS), and wherein the reception quality is a BRS receiving power.

17. The communication device of claim 1, wherein, to determine a reception quality for the selected main beam direction and adjacent main beam directions via the second directional antenna, the transceiver is configured to measure the reception quality for the selected main beam direction and adjacent main beam directions in one sub-frame.

18. The communication device of claim 1, wherein the transceiver is configured to determine the reception quality for at least some of the plurality of main beam directions using the first directional antenna periodically based on a rotational speed of the communication device.

19. A method for selecting a beam direction comprising:
   receiving a beamforming reference signal (BRS) using a first directional antenna and a second directional antenna in an Orthogonal Frequency Division Multiplexing (OFDM) symbol using a plurality of main beam directions;
   determining a BRS receiving power (BRS-BP) for at least some of a plurality of main beam directions using the first directional antenna;
   selecting a main beam direction of the plurality of main beam directions based on the BRS-BP determined by the first directional antenna;
   performing communication using the selected main beam direction via the first directional antenna; and
   determining a BRS-BP for the selected main beam direction and adjacent main beam directions via the second directional antenna.

20. A non-transitory computer readable medium having recorded instructions thereon which, when executed by a processor, make the processor perform a method for selecting a beam direction comprising:

receiving a reference signal using a first directional antenna and a second directional antenna in an Orthogonal Frequency Division Multiplexing (OFDM) symbol using a plurality of main beam directions;

determining a reception quality for at least some of a plurality of main beam directions using the first directional antenna;

selecting a main beam direction of the plurality of main beam directions based on the reception qualities determined by the first directional antenna;

performing communication using the selected main beam direction via the first directional antenna; and determining a reception quality for the selected main beam direction and adjacent main beam directions via the second directional antenna.

* * * * *